United States Patent
Patel et al.

(10) Patent No.: US 9,773,245 B1
(45) Date of Patent: Sep. 26, 2017

(54) ACQUIRING ITEMS USING GESTURES ON A TOUCHSCREEN

(75) Inventors: Imran S. Patel, Seattle, WA (US);
Umesh Kumar, Seattle, WA (US);
Gabriel E. Yeung, Seattle, WA (US);
Craig R. Brookes, Seattle, WA (US);
Tamal Saha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 855 days.

(21) Appl. No.: 13/311,285

(22) Filed: Dec. 5, 2011

(51) Int. Cl.
*G06Q 30/00* (2012.01)
*G06Q 20/40* (2012.01)
*G06F 21/32* (2013.01)
*G06F 3/0488* (2013.01)

(52) U.S. Cl.
CPC ............ *G06Q 20/40* (2013.01); *G06F 21/32* (2013.01); *G06F 3/04883* (2013.01); *G06Q 30/00* (2013.01)

(58) Field of Classification Search
CPC ..... G06Q 30/0609; G06Q 30/06; G06Q 30/08
USPC ......................... 705/26, 26.1–27.2
See application file for complete search history.

(56) References Cited

U.S. PATENT DOCUMENTS

| | | | |
|---|---|---|---|
| 5,960,411 A * | 9/1999 | Hartman et al. | 705/26.81 |
| 6,982,733 B1 * | 1/2006 | McNally et al. | 715/810 |
| 7,479,949 B2 * | 1/2009 | Jobs et al. | 345/173 |
| 7,593,000 B1 * | 9/2009 | Chin | 345/156 |
| 7,606,760 B2 * | 10/2009 | Hutchison et al. | 705/39 |
| 7,970,185 B2 * | 6/2011 | Kim et al. | 382/124 |
| 7,971,156 B2 * | 6/2011 | Albertson et al. | 715/863 |
| 8,553,947 B2 * | 10/2013 | Benini | G06K 9/00885 235/382 |
| 8,660,965 B1 * | 2/2014 | Bickerstaff | 705/64 |
| 9,082,117 B2 * | 7/2015 | Chin | G06F 3/04883 |
| 2003/0093507 A1 * | 5/2003 | Shapiro | H04L 29/06 709/222 |
| 2003/0141361 A1 * | 7/2003 | Nguyen | G06Q 30/02 235/380 |
| 2004/0093281 A1 * | 5/2004 | Silverstein et al. | 705/26 |
| 2004/0143765 A1 * | 7/2004 | Kazawa | G06F 21/6218 726/6 |
| 2006/0184431 A1 * | 8/2006 | Rosenberg et al. | 705/26 |
| 2010/0125495 A1 * | 5/2010 | Smith | G06Q 20/3223 705/14.23 |

(Continued)

OTHER PUBLICATIONS

How to bid and buy at auctions. (1968). Changing Times (Pre-1986), 22(4), 34. Retrieved from http://search.proquest.com/docview/199153541?accountid=14753.*

(Continued)

*Primary Examiner* — Rob Pond
(74) *Attorney, Agent, or Firm* — Lee & Hayes, PLLC

(57) ABSTRACT

Described herein are techniques for initiating item fulfillment at least partly in response to the users performing gestures on touchscreens of client devices. For instance, a user may operate a client device that renders content associated with an item offered by an offering service. The user may thereafter request to acquire the item by performing a gesture on a touchscreen of the client device. The offering service may receive the request and a representation of the gesture and, in response, may determine whether or not to initiate fulfillment of the item at least partly with reference to the received representation of the gesture.

28 Claims, 8 Drawing Sheets

(56) References Cited

U.S. PATENT DOCUMENTS

| | | | |
|---|---|---|---|
| 2010/0241517 A1* | 9/2010 | Lindahl | G06Q 20/20 705/16 |
| 2011/0106674 A1* | 5/2011 | Perlman | G06Q 20/40 705/30 |
| 2011/0156867 A1* | 6/2011 | Carrizo et al. | 340/5.85 |
| 2011/0282785 A1* | 11/2011 | Chin | G06F 3/04883 705/42 |
| 2011/0311110 A1* | 12/2011 | Benini | 382/115 |
| 2011/0314427 A1* | 12/2011 | Sundararajan | 715/863 |
| 2012/0054057 A1* | 3/2012 | O'Connell et al. | 705/26.1 |
| 2012/0130866 A1* | 5/2012 | Cooke et al. | 705/27.2 |
| 2013/0166332 A1* | 6/2013 | Hammad | 705/5 |

OTHER PUBLICATIONS

"Koninklijke Philips Electronics N.V. Files Patent Application for Personal Gesture Signature," Indian Patent News, Mar. 11, 2011, Proquest Dialog #856393279 3pgs.*

Yuan, Yu: "Image-based gesture recognition with support vector machines," Dissertation Abstracts International, Summer 2008, ProQuest Dialog #304629895, 156pgs.*

\* cited by examiner

ACQUIRING ITEMS USING GESTURES ON A TOUCHSCREEN

BACKGROUND

As electronic devices become a greater part of daily life, the amount of transactions conducted electronically continues to rise. For instance, users now regularly shop for digital and physical items from their desktop computers and, more and more, from their mobile electronic devices (e.g., mobile phones, tablets, etc.).

Often times, offering services that make items available for acquisition do not differentiate their processes for acquiring items based on whether the user is requesting an item from a desktop computer or from a mobile device. Furthermore, offering services often request that a user sign in to an account of the user maintained at the respective offering service prior to the user requesting to acquire an item from the service. To do so, the user often times must enter a user name and password associated with the user's account at the service. While typing out a user name and a password on a desktop computer is relatively easy given a typical keyboard size of a desktop computer, typing out this information on a mobile device having a much smaller keyboard presents difficulties. As such, as the number of users utilizing mobile devices continues to increase, easing the processes for conducting transactions with these devices remains a priority.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed, in part, to techniques for allowing users to acquire items at least partly in response to the users performing gestures on touchscreens of client devices. For instance, a user may operate a client device that renders content associated with an item offered by an offering service. The user may thereafter request to acquire the item by performing a gesture on a touchscreen of the client device. The offering service may receive the request and a representation of the gesture and, in response, may determine whether or not to initiate fulfillment of the item at least partly with reference to the received representation of the gesture.

For example, the user may have previously selected a gesture used for acquiring items from the offering service. Therefore, upon receiving the user's request and the representation of the gesture, the offering service may compare the representation of the received gesture with a representation of the previously selected gesture. If a similarity between the representation of the received gesture and the representation of the previously selected gesture is greater than a preset threshold, then the offering service may initiate fulfillment of the item. That is, the service may download the item to the client device (in the case of digital items), may initiate delivery of the item to a physical address of the user (in the case of physical items), may request that the user confirm the acquisition, or may initiate fulfillment in other ways as described below.

To interact with the offering service, the user may utilize a browser, a downloaded application, or any other client application. The offering service, meanwhile, may offer any sort of item for acquisition by the user, including digital items, physical items, or a combination thereof. For instance, the offering service may offer items that include products, services, electronic books, songs, images, links, videos, web pages, and/or any other type of digital or physical item that is acquirable by a user. As such, the offering service may comprise an e-commerce retailer, a brick-and-mortar merchant, a news site, a gaming platform, and/or any other entity that offers items for acquisition by users.

Figure 1:
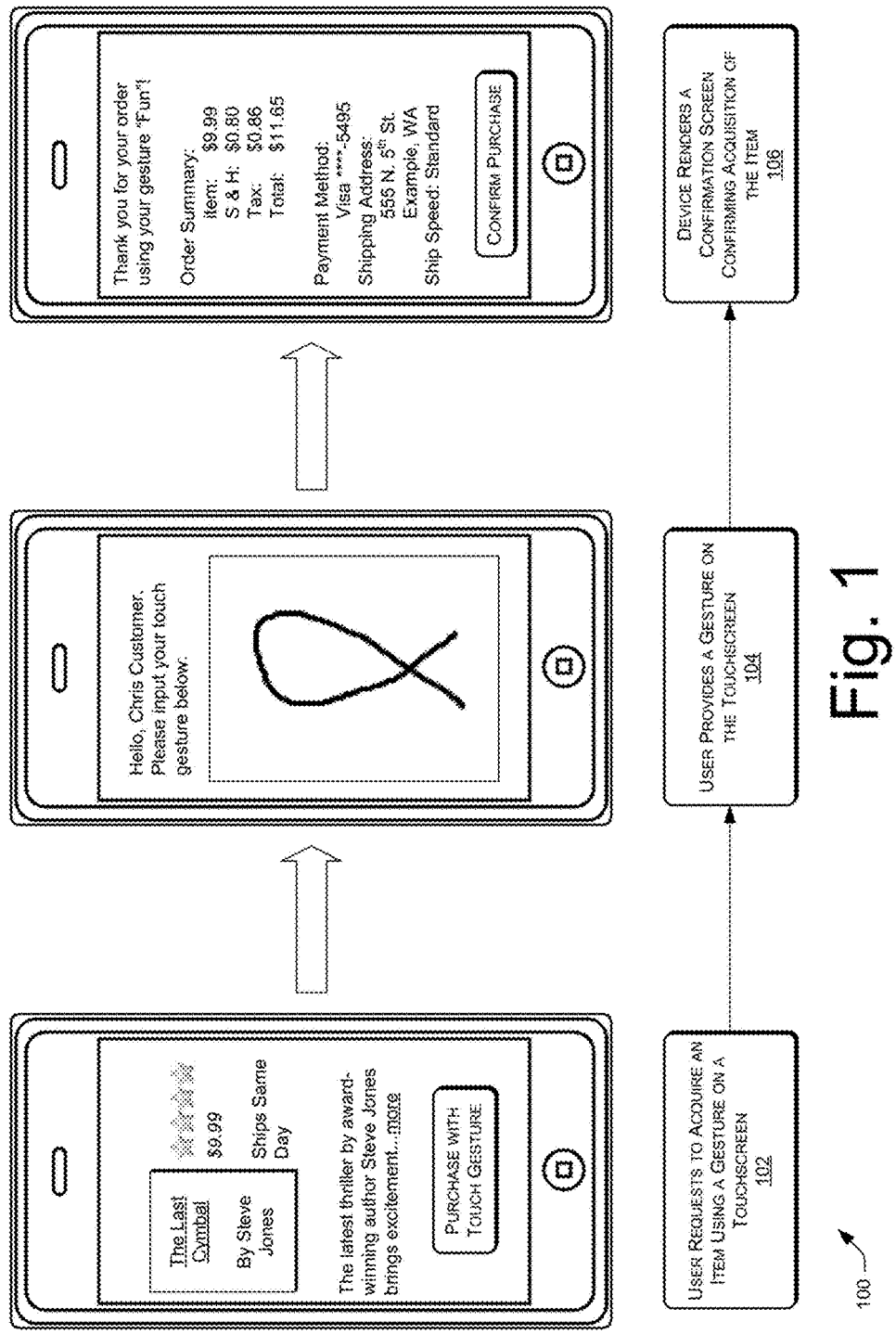
FIG. 1 illustrates an example process of a user acquiring an item by performing a gesture on a touchscreen of a client device.

FIG. 1 illustrates one example process 100 of a user acquiring an item by performing a gesture on a touchscreen of a client device. As illustrated, at 102 the device renders a user interface (UI) that includes content from an offering service that offers a book ("The Last Cymbal") for acquisition. While in this example the offering service offers the book for purchase, in other instances the items may be offered for lease, for rental, for free, or the like.

In addition to rendering details about the book, the content rendered on the screen of the client device also includes an icon ("Purchase with Touch Gesture") that, when selected, allows a user to request to purchase the item with use of a gesture on a touchscreen of the client device. At 102, the user requests to acquire the illustrated book by selecting the illustrated icon, although this request may be received audibly or in any other manner in other implementations.

At 104, and in response to the user's request, the client device renders a UI that requests that the user input a gesture on the touchscreen. In this example, the client device is associated with a particular user of the offering service ("Chris Customer"). As such, the user may have previously provided information identifying the customer in the form of an email address, user name, telephone number, or the like.

If the user has not previously provided this information, then the UI may additionally request that the user provide some sort of identifier for identifying the user (Chris Customer) at the offering service.

At 104, the user provides a gesture on the touchscreen of the client device. The user may provide this gesture with use of a stylus, a finger of the user, or the like. While this example illustrates the user providing a free-form gesture on the touchscreen, in other instances the gesture may comprise the user connecting multiple different static points in a predefined order, may comprise a particular fingerprint of the user, or may comprise any other type of gesture made on the touchscreen.

In response to the user providing this gesture, the client device provides a representation of the gesture and the information identifying the user to the offering service. In response to receiving this information, the offering service may identify one or more gestures previously associated with the customer (here, Chris Customer) to determine whether the gesture made by the user on the touchscreen matches any of the previously associated gestures.

If so, then the offering service may identify if any rules have previously been associated with the gesture. For instance, the rules may specify a spending limit associated with the gesture, categories of items that may be purchased with use of the gesture, a time of day that the gesture may be used for purchasing items, a geographical location at which the gesture may be used for purchasing items, or the like.

If the user's request to acquire the book complies with the rules associated with the gesture, or if the gesture is not associated with any rules, then the offering service may initiate fulfillment of the requested item. This may include requesting that the user providing payment information, shipping information, and the like in order to complete the order for the item. In other instances, meanwhile, the offering service may identify one or more aspects of a user account that have previously been associated with the gesture of the user. For instance, the user may have previously associated with the gesture a payment instrument, a shipping address (for physical items), a shipping speed, a device address (for digital items), and/or the like. As such, the offering service may initiate fulfillment with use of this information. This may include automatically charging a payment instrument for a cost of the illustrated book and initiating delivery of the book using the shipping address and shipping speed associated with the gesture. In other instances, the offering service may cause display of a UI on the client device requesting that the user confirm purchase of the illustrated book using the payment instrument, shipping address, and shipping speed previously associated with the gesture.

As shown at 106, in the illustrated example the offering service has automatically completed the requested purchase of the book using the information previously associated with the gesture. As such, at 106 the client device renders a confirmation screen indicating that the offering service has charged a particular payment instrument associated with the gesture for the book. The confirmation screen also indicates that the offering service has initiated delivery of the book to the shipping address associated with the gesture and using the previously associated shipping speed.

As the process 100 illustrates, the user of the client device is able to provide a gesture on a touchscreen rather than having to fully authenticate with the offering service by, for example, typing both a user name and password on the client device. In this example, the process 100 thus saves the user the difficulty of having to type in a potentially complicated password on a relatively small virtual keyboard provided by the client device. Instead, the user performs a more convenient gesture that the user has previously selected.

Furthermore, the techniques described below may allow a user manage the gestures associated with the user account when the user fully authenticates with the offering service. For instance, when a user wishes to associate a new gesture with the user's account, remove an association between an existing gesture and the user's account, modify information (e.g., shipping address, payment instrument, etc.) associated with an existing gesture, or otherwise manage the user's gestures, the offering service may allow the user to do so when the user provides a password or personal identification number (PIN) associated with the user account. As such, knowledge of the gesture alone does not allow a user to add, remove, or alter associated gestures or information associated with these gestures.

While FIG. 1 illustrates one example process 100 that utilizes gestures for acquiring items, the techniques described herein may apply equally for acquiring items in any other manner. Furthermore, while the techniques are described below with reference to one example architecture, these techniques may apply in multiple other different architectures and environments.

Example Architecture

Figure 2:
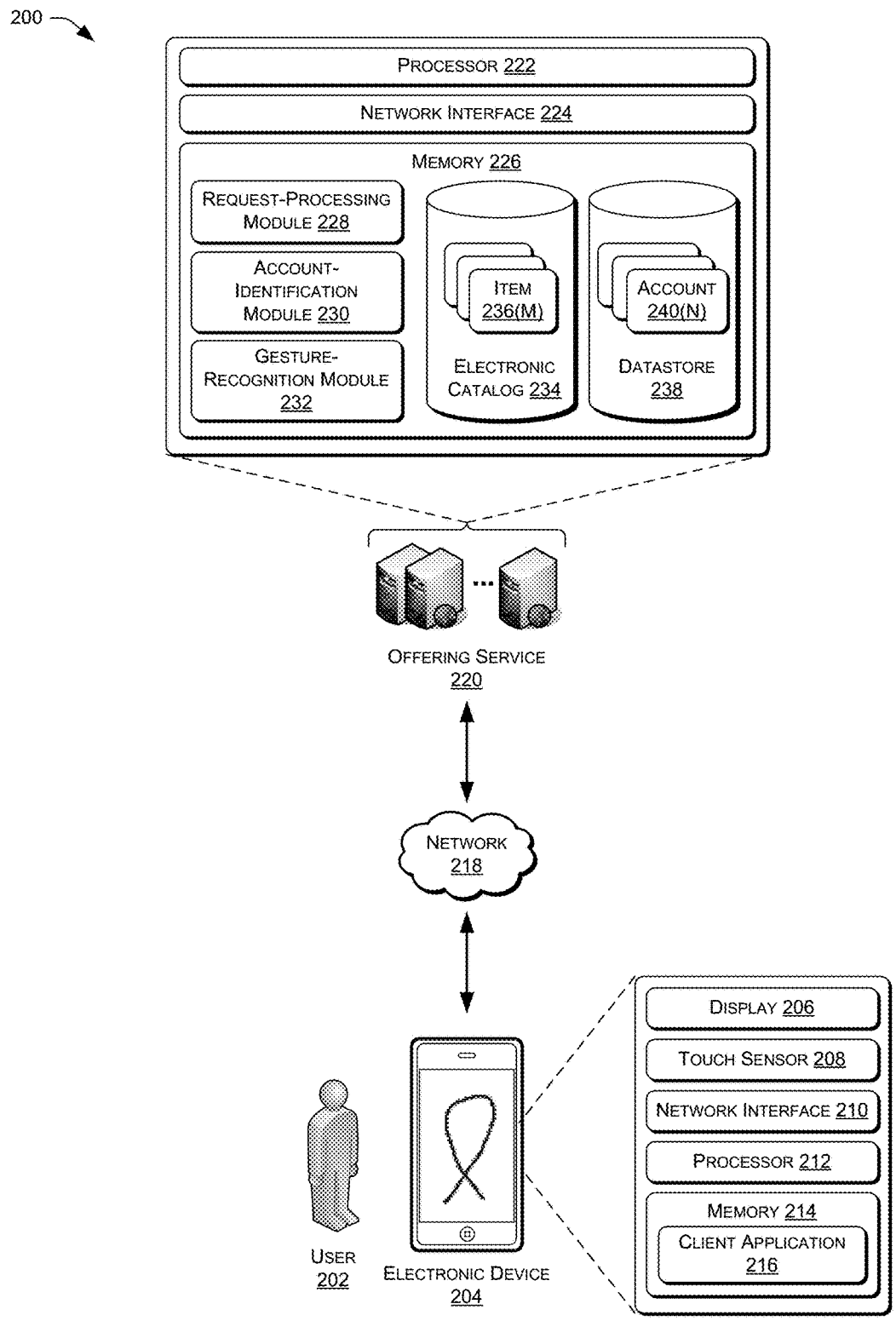
FIG. 2 illustrates an example architecture that may implement techniques for enabling users to acquire items by performing gestures on touchscreens of client devices. As illustrated, the architecture includes an offering service that is configured to initiate fulfillment of items requested by an example user at least partly in response to the user performing a gesture on a touchscreen of the user's electronic device.

FIG. 2 illustrates an example architecture 200 that may implement techniques for enabling users to acquire items by performing gestures on touchscreens of client devices. As illustrated, the architecture 200 includes a user 202 operating an electronic device 204, which may comprise any type of mobile electronic device (e.g., a mobile phone, a personal digital assistant (PDA), a laptop computer, etc.) or stationary electronic device (e.g., a desktop computer, etc.). In either instance, the device 204 includes a display 206 and a touch sensor 208. The display 206 may comprise a liquid crystal display (LCD), a light-emitting diode (LED) display, an electronic paper display, or any other type of display or combination of displays. The touch sensor 208, meanwhile, is configured to detect touch inputs from the user 202 and may comprise a capacitive touch sensor, a force sensitive resistor (FSR) touch sensor, or any other type of touch sensor. In some instances, the touch sensor 208 resides underneath atop, or integral with the display 206 to form a touchscreen. In other instances, meanwhile, the touch sensor 208 is separate from the display 206, similar to a touchpad of a laptop computer.

As illustrated, the device 204 further includes a network interface 210, a processor 212, and memory 214, which may store an array of data and applications including a client application 216. The network interface 210 allows the electronic device to communicate over a network 218 to different entities, such as an offering service 220. The illustrated network 218 may include any one or combination of multiple different types of public or private networks (e.g., cable networks, the Internet, wireless networks, etc.). In some instances, the device 204 communicates with the offering service 220 over the network 218 using a secure protocol (e.g., https).

The memory 214 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As illustrated, the memory 214 stores or otherwise has access to the client application 216, which may comprise a browser application, an application provided by the offering service 220 and previously downloaded to the device 204, or any other type of client application. In each of these instances, the user 202 may utilize the client application 216 to interact with content provided by the offering service 220 and to request one or more items offered by the service 220. As described in detail below, the user 202 may perform gestures on the touch sensor 208 as part of a user's request for an item.

The offering service 220 may comprise an e-commerce retailer, a brick-and-mortar merchant, a news site, a gaming platform, and/or any other entity that offers items for acquisition by the user 202 and other users. These items may include physical goods, digital goods, services, or any combination thereof. In addition, these items may be offered for sale, for rent, for lease, for download, and/or for any other form of consumption.

As illustrated, the offering service 220 includes a processor 222, a network interface 224, and memory 226. The memory 226 stores or otherwise has access to a request-processing module 228, an account-identification module 230, and a gesture-recognition module 232. In addition, the offering service 220 stores or otherwise has access to an electronic catalog 234 containing information about one or more items 236(1), . . . , 236(M) offered for acquisition, as well as a datastore 238 storing information regarding one or more user accounts 240(1), . . . , 240(N) at the offering service 220.

With use of the client application 216, the user may view on the display 206 information associated with the items 236(1)-(M) offered by the offering service 220. These items may include physical items (i.e., tangible goods), digital items (e.g., electronic books, web pages, artwork, etc.), representations of services, or any other type of item that is acquirable by a user. After viewing this information, the user 202 may utilize the client application 216 to request to receive one or more items. In addition, the user 202 may input a gesture on the touch sensor 208 in association with the request for the item(s). The electronic device 204 may also provide an identifier of the user 202 or of the device 204 to the offering service 220. As described below, the identifier may comprise a user name of the user 202, an email address of the user 202, a telephone number of the user 202, a device identifier (e.g., a MAC address) of the device 204, and/or any other type of identifying information.

The request-processing module 228 may receive the request for the item along with the identifier and a representation of the gesture (e.g., an image of the gesture, a hash of the image of the gesture, etc.). In response to receiving some or all of this information, the request-processing module 228 may provide the received identifier to the account-identification module 230, which utilizes the identifier to identify a user account of the user 202 from within the datastore 238. After identifying the particular user account of the user 202, the account-identification module 230 may provide an identity of the account to the gesture-recognition module 232.

In response to receiving the indication of the user account, the gesture-recognition module 23 may identify any gestures that have been previously associated with the account of the user 202. In response to identifying these gestures, the gesture-recognition module 232 may compare representations of the previously associated gestures with the received representation of the gesture made by the user on the touch sensor 208. The gesture-recognition module 232 may also compute a similarity between each pair of representations and may determine whether the computed similarity is greater than a preset similarity threshold. If so, then the gesture-recognition module 232 may designate the gesture made by the user 202 on the touch sensor 208 as a match to a gesture previously associated with the account of the user. In some instances, the similarity threshold is set by the offering service 220, while in other instances the user 202 may set the threshold for determining how similar a gesture on the touch sensor must be to a previously associated gesture to indicate a match there between.

After determining that the user's gesture on the touch sensor 208 comprises a gesture previously associated with the user account, the gesture-recognition module 232 may provide an indication of this match to the request-processing module 228. Thereafter, the request processing module 228 may determine whether the gesture has been associated with one or more rules, as described in more detail below with reference to FIG. 3.

The rules associated with a particular gesture may dictate any sort of rule related to the processing of a user request for an item. For instance, the user 202 may have indicated that a particular gesture may be used to acquire items that are from a certain category of items in the electronic catalog 234. For example, the user may indicate that a first gesture may be used to acquire books but not sporting goods, while a second, different gesture may be used for all items other than books. Additionally or alternatively, the user 202 may specify a particular spending limit for association with the gesture. For instance, the user 202 may specify that a particular gesture may be used for up to $50 of purchases per month.

In yet another example, the user 202 may specify that a particular gesture may be used at particular times, such as between a particular time-of-day range, on particular dates, or the like. To provide an example, the user 202 may indicate that a particular gesture may be used to acquire items between the hours of 8 am and 8 pm on weekdays, but not during the remaining hours and days of the week.

In still other instances, the user 202 may specify that a particular gesture is authorized for use when the user 202 is within one or more particular geographical locations, specified in terms of latitude and longitude, city and/or state, connection to particular wireless access points, or in any other manner. For example, the user 202 may specify that a particular gesture may be used in the town of "Example, WA" but not outside of this area. As such, when the device 204 provides a request for an item along with a representation of a gesture made by the user 202 on the touch sensor 208, the device 204 may also include an indication of a geographical location of the device 204 at the time that the user 202 made the gesture on the sensor 208. The geographical location information may comprise a latitude and longitude of the device 204 (e.g., from a GPS component on the device 204), a current wireless access point that the device 204 is connected to, an indication of the device's location via cellular tower triangulation, or the like.

Upon identifying any rules associated with the gesture made by the user 202 on the touch sensor 208, the request-processing module 228 may determine whether the user's request complies with these rules. For instance, the module 228 may determine if the requested item is within an authorized category of items, may determine if the request complies with the spending limit set for the gesture, may determine if the time or location of the request occurred at an authorized time or location, and/or the like.

If the request complies with the rules, or if the gesture is not associated with any rules, then the request-processing module 228 may initiate fulfillment of the requested item. For instance, the module 228 may identify information from the user account of the user 202 for the purpose of fulfilling the request. For example, the module 228 may identify a payment instrument of the user 202, a shipping address of the user 202, a shipping speed preferred by the user 202, and the like. The module 228 may then utilize this information for fulfilling the request by automatically charging the payment instrument for the cost (if any) of the requested item and may initiate delivery of the item to the specified address using the specified shipping speed. In another example, the module 228 may serve a UI to the client application that includes this information (payment information, shipping information, etc.) and that requests that the user 202 confirm the request to obtain the item. For digital items, meanwhile, the module 228 may identify an address previously specified by the user (e.g., a device address, an email address, etc.) and may either serve the requested item to the specified address or may request that the user confirm the address prior to delivery.

While FIG. 1 illustrates the offering service 220 as containing the illustrated modules, these modules and their corresponding functionality may be spread amongst multiple other actors. For instance, in some implementations a different entity may maintain the electronic catalog 234 and the service 220 may fulfill item requests on behalf of this entity and multiple other entities. In addition, while FIG. 1 illustrates several example components, it is to be appreciated that each computing device described herein may include additional functionality, such as operating systems, input and output devices, and the like, as one of ordinary skill in the art will appreciate.

Figure 3:
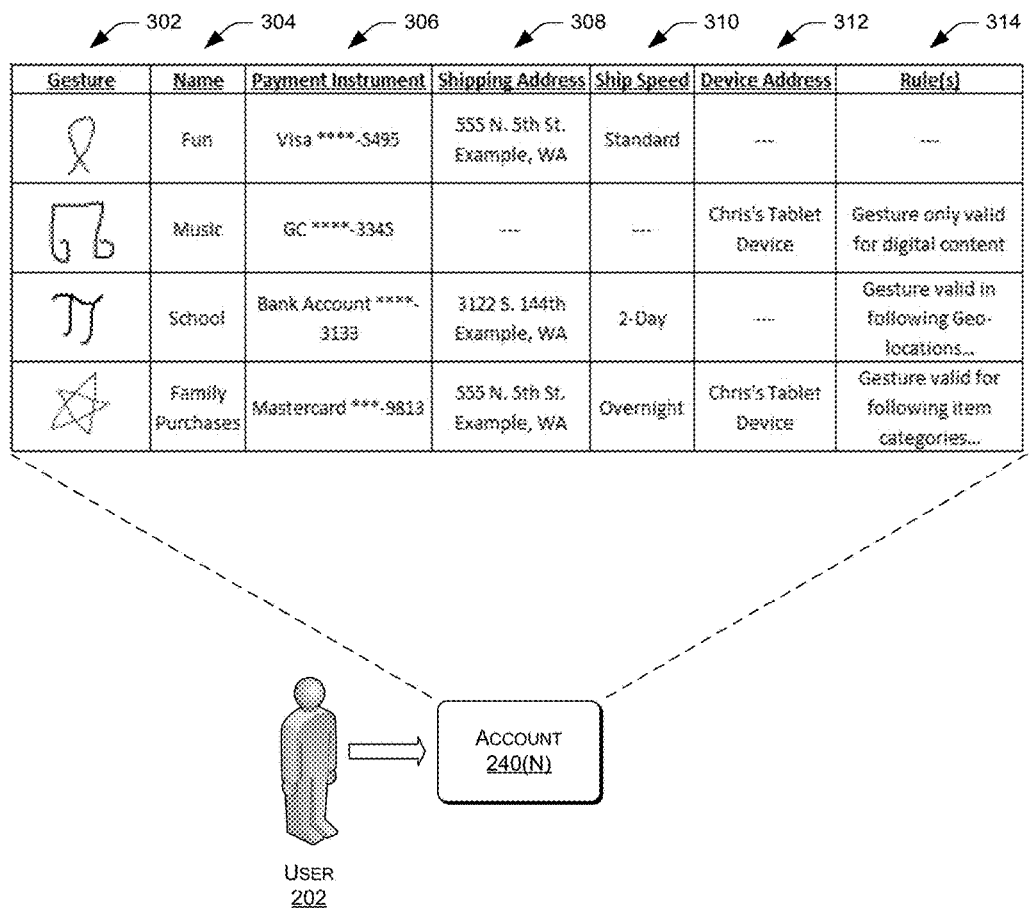
FIG. 3 illustrates details associated with an example account of the user at the offering service of FIG. 2. In this example, the user account is associated with four gestures, each of which may be associated with a payment instrument, a shipping address, a shipping speed, a device address, a rule, and/or other criteria that the service may use in response to receiving a request from a user to acquire an item using a respective gesture.

FIG. 3 illustrates details associated with an example account 240(N) of the user 202 at the offering service 220. In this example, the user account 240(N) is associated with four gestures 302, although each user account may be associated with any number of gestures in other instances. The offering service 220 may have previously associated each of the four gestures 302 with the user account 240(N), potentially in response to receiving a request to do so from the user 202. For instance, the user may have requested to associate each these four gestures with the user's account 240(N) by performing the gestures on the touch sensor 208 of the user's device 204.

As illustrated, each of the gestures 302 may be associated with a name 304, at least one payment instrument 306 (e.g., credit card, debit card, stored value account, bank account, etc.), shipping address 308, shipping speed 310, device address 312, and/or rules 314. Furthermore, while a few example aspects of a user account are illustrated, it is to be appreciated that each of the gestures 302 may additionally or alternatively be associated with any other criteria, such as preferred formats, item sizes, preferred colors, preferred font sizes, email addresses to which to send digital items, or the like.

In the illustrated example, the first listed gesture has been associated with a name ("Fun"), which the user 202 may have chosen. For instance, the user 202 may have chosen this example name to indicate that purchases made with this gesture are for non-school and non-work items, such as items for the user's own personal enjoyment. In addition, the gesture 302 has been associated with a particular credit card of the user (a Visa® card), a particular shipping address of the user (e.g., the user's home address), and a preferred shipping speed (standard). This gesture has not been associated with a device address or with any rules. Therefore, when the user utilizes the first gesture to request an item offered by the offering service 220, the offering service may either automatically charge the user's Visa® card and ship the requested item to the listed address using standard shipping or may request that the user confirm use of the associated Visa® card, shipping address, and shipping speed.

The second listed gesture, meanwhile, is associated with a different name ("Music") and a different payment instrument, which comprises a gift card (or stored value account) in this example. In addition, while the second gesture has not been associated with a shipping address or shipping speed, the gesture has been associated with a particular device address ("Chris's Tablet Device"). This gesture has also been associated with a rule indicating that the gesture is only valid for acquiring digital content. Therefore, when the user 202 utilizes the second listed gesture when requesting to acquire an item, the offering service 220 may first determine whether or not the requested item comprises digital content. If so, then the offering service 220 may charge any cost of the item to the gift card or stored value account and may deliver the digital content item (e.g., wirelessly) to the user's tablet device. If the item is not a digital item, meanwhile, the service 220 may indicate to the user that the service did not initiate fulfillment of the item. The service 220 may or may not indicate to the user that the gesture made by the user is only authorized for acquiring digital content.

The third listed gesture, meanwhile, has been associated with yet another name ("School"), as well as a bank account of the user 202, a different shipping address (e.g., a user's office address), a different shipping speed (2-day), and a rule indicating that the gesture is only valid when used at particular geographical locations. Therefore, when the user 202 requests to acquire an item using the third gesture, the offering service 220 may first determine whether the location of the device 204 when the user 202 made the gesture is a location at which the gesture is authorized for use. If so, then the offering service may charge the bank account for the cost of the item and may initiate delivery of the item to the listed shipping address using 2-day shipping (or may request that the user confirm this acquisition using the associated payment and shipping information).

Finally, in this example the fourth listed gesture has been associated with a name ("Family Purchases"), a different credit card (a MasterCard® card), the home address of the user listed above, still another type of shipping speed (overnight), a particular device address (again, the tablet device), and a rule indicating that the gesture may be used to acquire items that are within one or more particular categories of items. Therefore, when the user 202 requests to acquire an item using the fourth listed gesture, the offering service 220 may first determine whether or not the requested item is within the allowed categories of items. If so, then the offering service may determine whether the item is a physical item or a digital item. If the former, then the service 220 may charge the user's credit card and initiate delivery of the item using the associated shipping information (or may first request that the user 202 confirm the purchase). If, however, the item is a digital item, then the service 220 may initiate delivery of the item to the user's tablet device (or may first request that the user 202 confirm the purchase).

Example Operation

FIGS. 4A-D collectively illustrate an example process 400 where the example user 202 requests to acquire an item with use of a gesture on a touchscreen and, in response, the service initiates fulfillment of the item. The process 400 is described as a sequence of operations. Those operations listed underneath the electronic device 204 may be implemented by the device 204, while the operations listed underneath the offering service 220 may be performed by the service 220. It is to be appreciated, however, that the process 400 is merely representative of one example implementation, and more or fewer operations may be performed by the same or different entities in different implementations.

This process 400, as well as each process described herein, can be implemented in hardware, software, or a combination thereof. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 400 includes, at 402, the electronic device 204 receiving a selection of an item offered for acquisition. In one example, the user 202 may have navigated the electronic catalog 234 provided by the offering service 220 and selected a particular item. For instance, the user may have requested to place an item in a virtual shopping cart of the user or may have selected the item in any other manner. Thereafter, at 404 the device 204 may receive (e.g., from the user 202) a request to acquire the item using a gesture on the touchscreen of the device. This request may be received via selection of an icon on the touchscreen, audibly, or in any other manner.

At 406, the electronic device 204 may request that the user 202 provide an identifier and the device may receive this identifier in response. For instance, the device 204 may render a text box requesting that the user input a user name of the user at the offering service, an email address associated with the user 202, a telephone number associated with the user 202, or any other identifying information. In some instances, the device 204 may refrain from requesting that the user provide this identifier if the user 202 has previously input this information into the device 204, which may store this identifier (e.g., as state information, in the form of a cookie or otherwise) in response.

At 408, the device 204 may thereafter request that the user 202 input a gesture on the touch screen of the device, and may receive a gesture of the user in response. For instance, the device 204 may render the UI shown at operation 104 of FIG. 1, which provides an area in which the user 202 may provide a gesture on the touchscreen.

After receiving the gesture of the user 202, at 410 the device 204 may provide the request for the item, the identifier, and a representation of the gesture to the offering service 220. In some instances, the device 204 may provide this information in single transmission, while in other instances the device 204 may transmit this information individually or in any other combination. At 412, the offering service 220 receives the request, the identifier, and the representation of the gesture. Again, the service 220 may receive these pieces of information collectively, one at a time, or in any other manner.

Figure 4A:
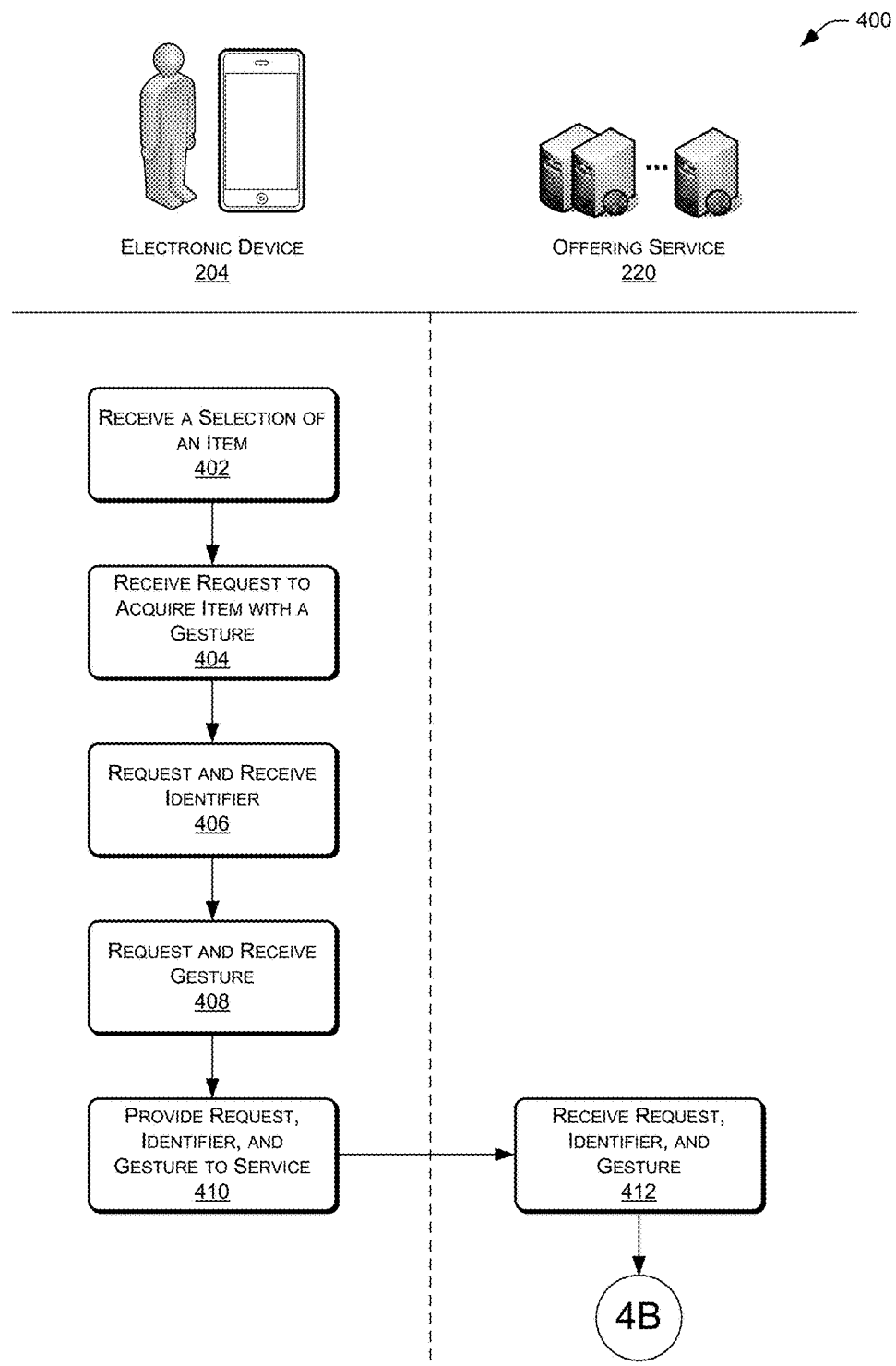
FIGS. 4A-D collectively illustrate an example process where the example user requests to acquire an item with use of a gesture on a touchscreen and, in response, the service initiates fulfillment of the item.
Figure 4B:
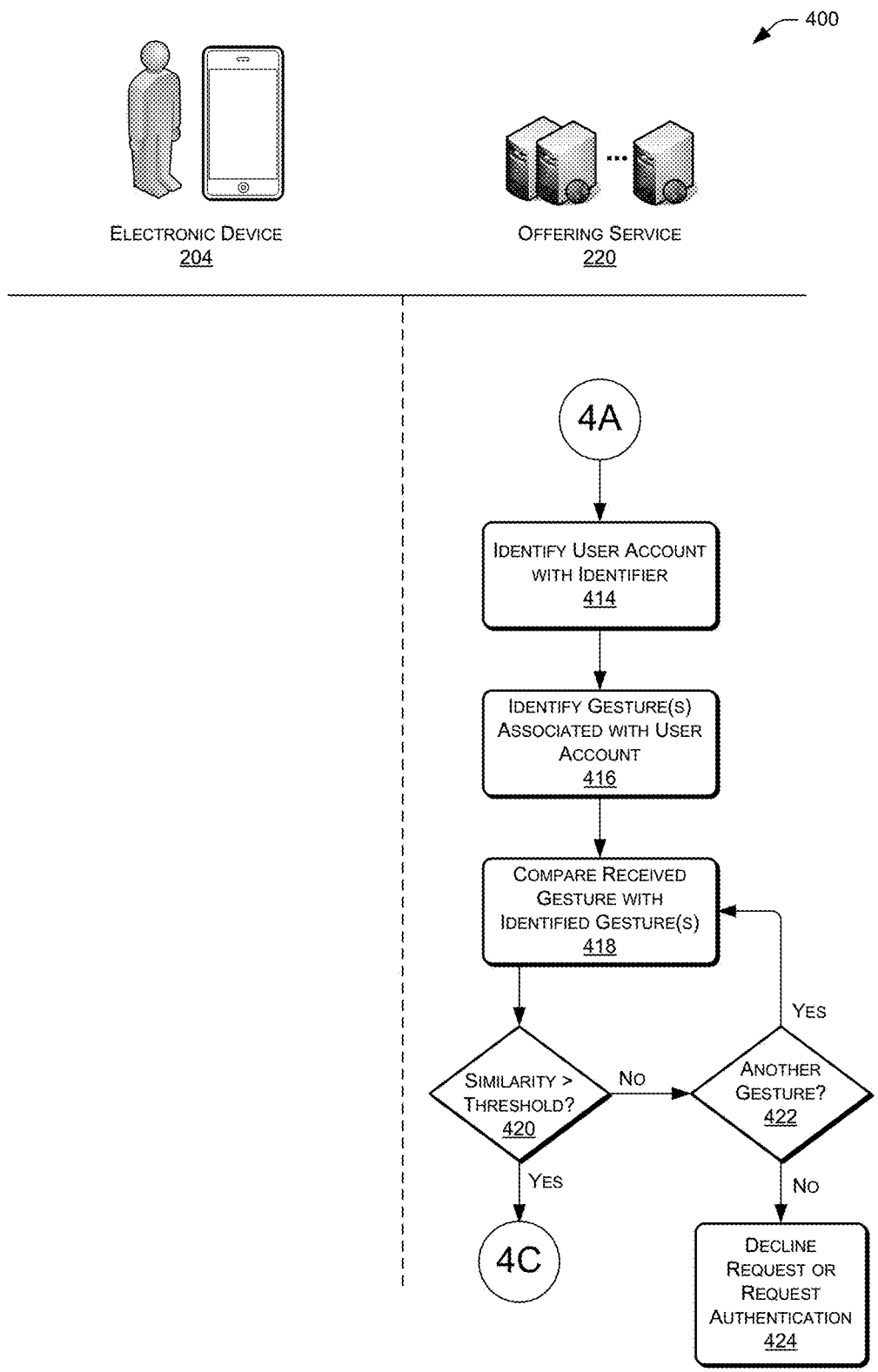

FIG. 4B continues the illustration of the process 400 and includes, at 414, identifying a user account of the user 202 using the received identifier. For instance, the service 220 may map a received user name, email address, or the like to the user account 240(N). At 416, the service 220 may then identify one or more gestures that have been previously associated with the user account. For example, in the example user account 240(N), the service 220 may identify the four example gestures that have previously been associated with the user account 240(N).

At 418, the service 220 compares the received representation of the gesture made by the user 202 on the touchscreen with representations of the gestures previously associated with the user account. For instance, the service 220 may compare the received representation with a representation of a first gesture associated with the user account. At 420, the service 220 may determine whether the similarity between these two representations is greater than a predefined similarity threshold. If not, then the service 220 determines at 422 whether the user account is associated with another gesture and, if so, the service 220 proceeds to compare the received representation with a representation of a second gesture associated with the user account (and so forth).

If, however, the received representation does not have a similarity to a representation of a gesture previously associated with the user account that is greater than the threshold, then at 424 the offering service 220 may either decline the user's request for the item, may request that the user re-enter their gesture, or may request that the user authenticate. That is, the service 220 may serve a user interface (UI) to the device 204 indicating that the request has been declined (i.e., may serve an error message), requesting that the user re-enter or re-try their gesture, or requesting that the user provide a password, a personal identification number (PIN), or other authentication means prior to the service 220 initiating fulfillment of the requested item. In some instances, the service 220 may allow the user to attempt their gesture a certain number of times before disabling the user's ability to acquire items using a gesture for some period of time or until the user authenticates using additional authentication information (e.g., username and password, etc.).

Figure 4C:
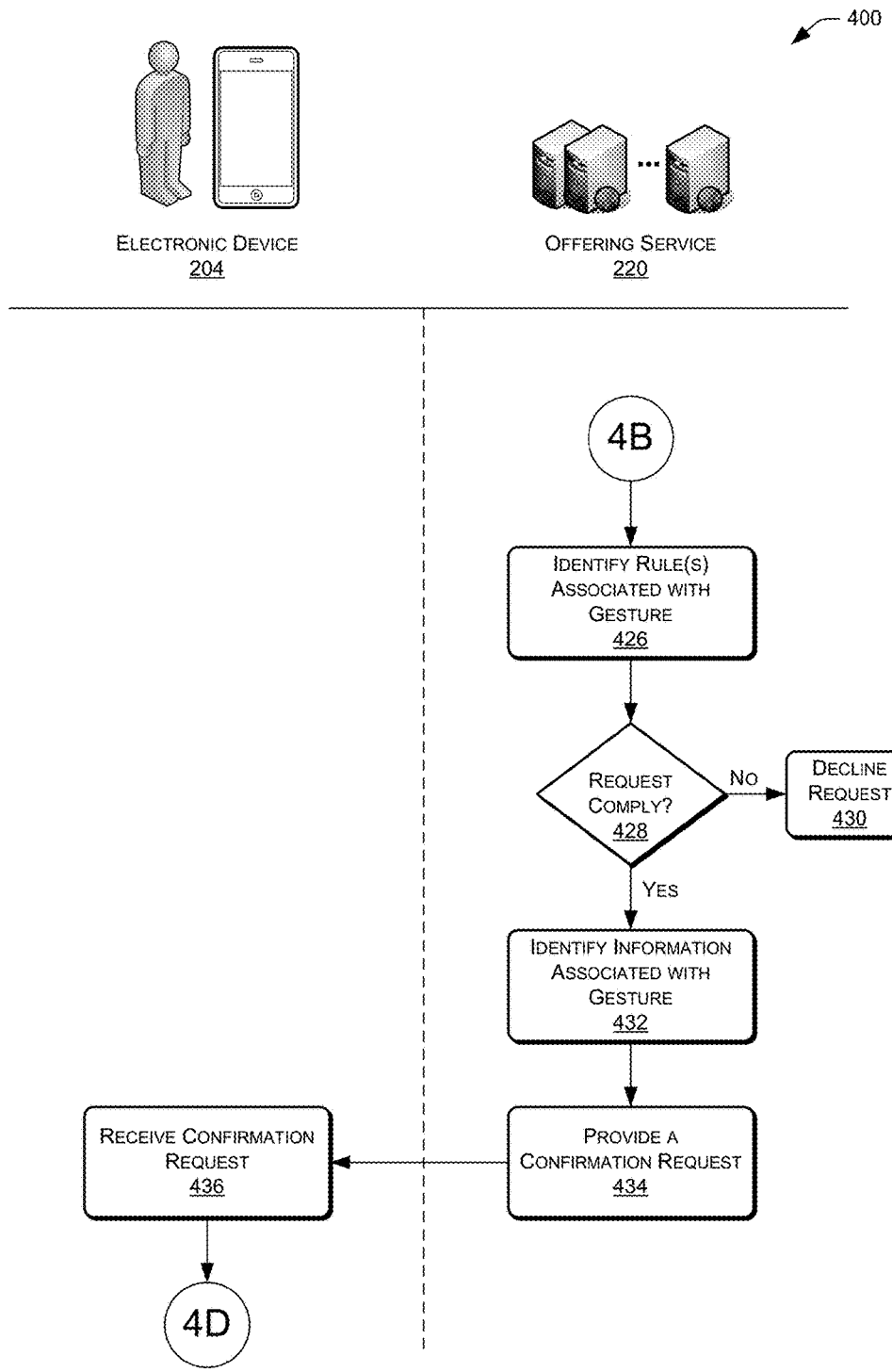

If, however, the received representation of the gesture matches a representation of a gesture previously associated with the user account, then the process 400 proceeds to FIG. 4C. At 426, and after identifying the match, the offering service 220 identifies any rules that have been associated with the received gesture. At 428, the service then compares the request for the item with any identified rules to determine whether or not the request complies within the identified rules. If the request does not comply, then the offering service 220 declines the request for the item at 430.

If, however, the request does comply with the identified rules (or if the gesture is not associated with any rules), then at 432 the offering service may identify one or more pieces of information associated with the gesture that may be used to fulfill the request. This may include any of the information described above, such as a payment instrument, shipping address, shipping speed, device address, and/or the like.

In this example, the offering service 220 then initiates fulfillment by providing a confirmation request to the electronic device 204 at 434. For instance, the service 220 may serve a UI to the device 204 requesting that the user 202 confirm purchase of the requested item using a payment instrument associated with the gesture, a shipping address associated with the gesture, and the like. In other implementations, meanwhile, the service 220 may initiate fulfillment by automatically charging the payment instrument and shipping or otherwise delivering the item using the address information associated with the gesture. In the illustrated example, however, the electronic device 204 receives the confirmation request at 436 and renders it on the display of the device 204.

Figure 4D:
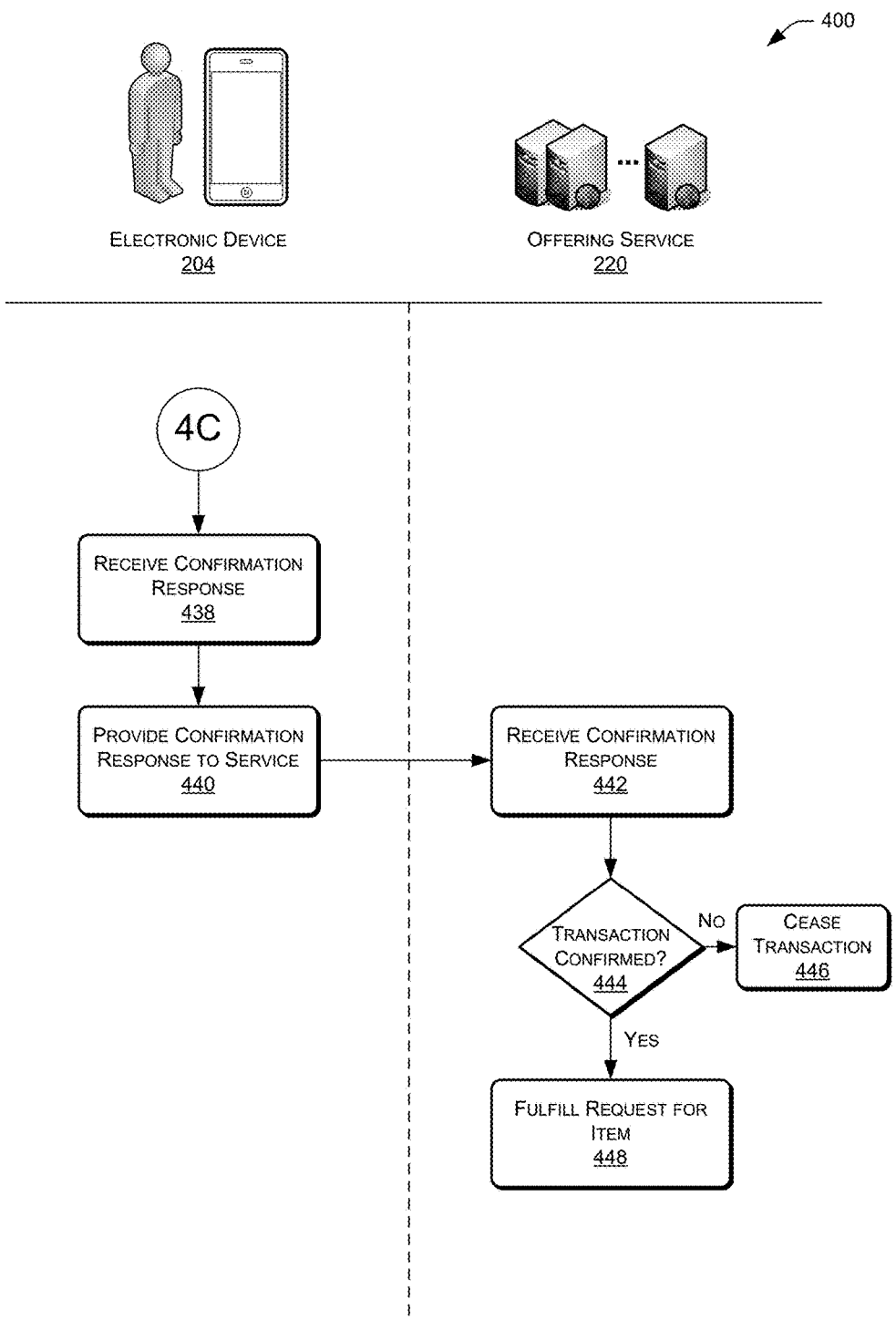

FIG. 4D concludes the illustration of the process 400 and includes, at 438, the device 204 receiving a confirmation response from the user. That is, the user 202 may indicate whether he or she wishes to complete the requested transaction for the item using the identified payment instrument, shipping or device address, and the like. In some instances, the response comprises a yes or no response, while in other instances the user 202 may modify one or more parameters (e.g., may switch payment instruments, etc.) before requesting to complete the transaction.

At 440, the electronic device 204 provides the confirmation response to the offering service 220, which receives this response at 442. At 444, the offering service 220 determines whether the confirmation response confirms the transaction. If not, then the offering service 220 ceases the transaction at 446. If so, however, then the offering service 220 fulfills the request for the item at 448 by, for example, charging the specified payment instrument for a cost of the item and shipping or otherwise delivering the item to the user 202.

Figure 5:
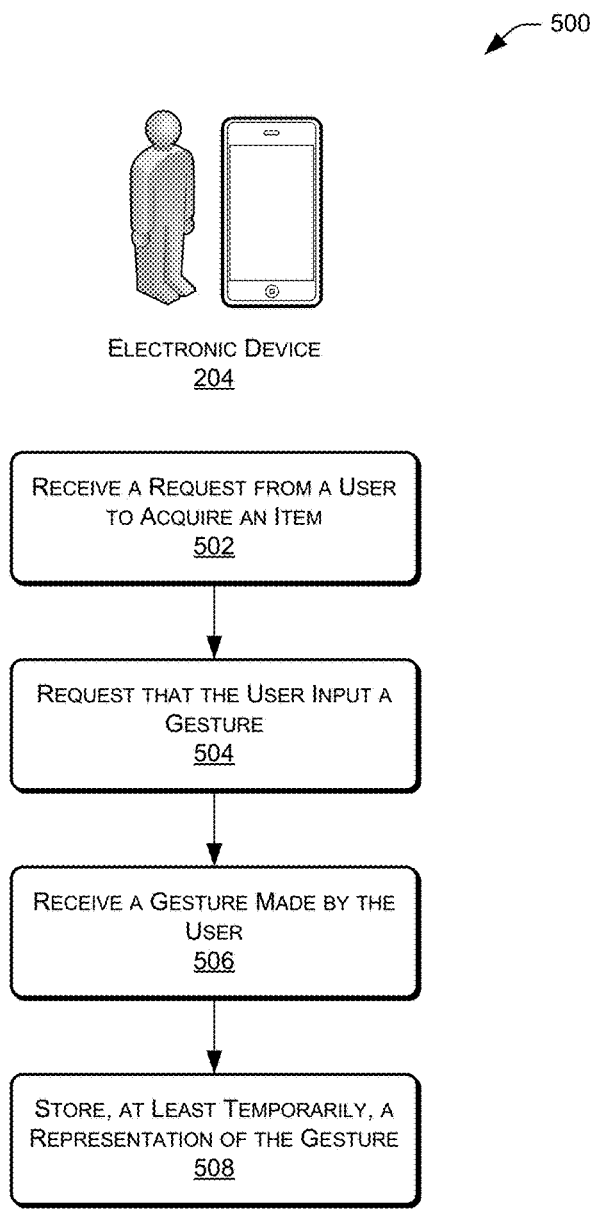
FIG. 5 illustrates an example process that a client device may perform when a user seeks to acquire an item from an offering service with use of a gesture on a touchscreen of the client device.

FIG. 5 illustrates an example process 500 that the electronic device 204 may perform when a user seeks to acquire an item from an offering service with use of a gesture on a touchscreen of the device 204. At 502, the device receives a request from the user to acquire an item from an offering service. In response, at 504 the device requests that the user input a gesture on the device's touchscreen.

At 506, the device 204 receives a gesture made by the user on the touchscreen. At 508, the device 204 stores a representation of the gesture of the gesture at least temporarily. This representation may comprise an image of the gesture, a hash of the image, or any other type of representation of the gesture. After storing the representation, the device 204 may either transmit the representation of the gesture to the offering service (as described above with reference to FIGS. 4A-D) or may locally utilize the representation for comparing it to representations previously associated with an account of the user at the offering service.

For instance, the offering service may provide representations of gestures previously associated with the account of the user to the device 204. In response to receiving these representations, the device 204 may perform the comparing described above to determine whether the gesture made by the user on the touchscreen matches a representation of a gesture previously associated with the account of the user. The device 204 may then provide an indication of this comparison back to the offering service. For instance, if the device 204 identifies a matching representation, then the device 204 may provide an indication of this match back to the offering service. In response, the service may initiate fulfillment of the requested item as described above with reference to FIGS. 4A-D. If the device 204 does not find a matching representation, however, then the device 204 may provide this indication to the offering service, which may then serve a UI to the client device either declining the user's request or requesting that the user authenticate (e.g., with a user's password) prior to initiating fulfillment of the requested item.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. One or more non-transitory computer-readable media storing computer-executable instructions that authenticate a user to an offering service in response to receiving a representation of a gesture, wherein the computer-executable instructions, when executed on one or more processors, cause the one or more processors to perform acts comprising:
   sending information about an item and one or more transaction details to a client device for display, the client device having a user interface including a touchscreen configured to present a purchase option to request a purchase of the item;
   establishing, via a secure protocol, a communicative connection with the client device;
   receiving, from the client device:
      an identifier,
      an indication of a selection of the purchase option to request purchase of the item, and
      a first representation of a gesture made via the touchscreen, the first representation of the gesture including at least an image of the gesture;
   determining, based at least in part on receiving the identifier, a user account associated with the client device;
   identifying, based at least in part on determining the user account, a plurality of previously stored gestures associated with the user account, individual stored gestures of the plurality of previously stored gestures being associated with one or more rules and having been created by a user associated with the user account;
   computing respective similarities between the individual stored gestures of the plurality of previously stored gestures and the first representation of the gesture;
   identifying a similarity threshold, the similarity threshold having been set by the user associated with the user account;
   authenticating the request to purchase the item based at least in part on one of the respective similarities between a particular stored gesture of the plurality of previously stored gestures and the first representation of the gesture being greater than the similarity threshold;
   identifying the one or more rules associated with the particular stored gesture, the one or more rules specifying criteria that the one or more transaction details are to satisfy prior to initiating fulfillment of the request to purchase the item;
   determining that the one or more transaction details satisfy the criteria of the one or more rules; and
   based at least in part on the transaction details satisfying the criteria of the one or more rules:
      identifying a shipping speed associated with the particular stored gesture; and
      initiating the fulfillment of the request to purchase the item, wherein initiating the fulfillment includes shipping the item with the shipping speed associated with the particular stored gesture.

2. The one or more non-transitory computer-readable media as recited in claim 1, wherein the gesture comprises at least one of a free-form gesture, a gesture connecting multiple different static points in a predefined order, or a fingerprint of the user on the touchscreen.

3. The one or more non-transitory computer-readable media as recited in claim 1, wherein identifying the similarity threshold is based at least in part on a previous user selection associated with the identifier.

4. The one or more non-transitory computer-readable media as recited in claim 1, wherein the identifier comprises at least a user name, an email address, a telephone number, or state information stored on the client device.

5. A method, comprising:
sending, to a user for display, information about an item for acquisition, the item being associated with one or more transaction details;
receiving, by at least one or more computing devices, from a client device that includes a touchscreen:
an identifier,
a request to acquire the item, and
a representation of at least one free-form gesture received via the touchscreen made by the user on the touchscreen subsequent to the request to acquire the item;
determining, by the at least one of the one or more computing devices and based at least in part on the identifier, a user account associated with the client device;
identifying, by the at least one of the one or more computing devices and based at least in part on determining the user account, a plurality of previously stored free-form gestures associated with the user account, individual stored free-form gestures of the plurality of previously stored free-form gestures being associated with one or more rules and having been created by a user associated with the user account;
computing respective similarities between the individual stored free-form gestures of the plurality of previously stored free-form gestures and the representation of the at least one free-form gesture;
identifying a similarity threshold, the similarity threshold being set by the user associated with the user account;
authenticating, by the at least one of the one or more computing devices, the request to acquire the item based at least in part on one of the respective similarities between the at least one free-form gesture and at least one stored free-form gesture of the plurality of previously stored free-form gestures being greater than the similarity threshold;
identifying, by the at least one of the one or more computing devices, the one or more rules associated with the at least one stored free-form gesture, the one or more rules specifying criteria that the one or more transaction details are to satisfy prior to initiating fulfillment of the item;
determining, by the at least one of the one or more computing devices, that the one or more transaction details satisfy the criteria of the one or more rules; and
based at least in part on the transaction details satisfying the criteria of the one or more rules:
identifying a shipping speed associated with the at least one stored free-form stored gesture; and
initiating the fulfillment of the item, wherein initiating the fulfillment includes shipping the item with the shipping speed associated with the at least one stored free-form gesture.

6. The method as recited in claim 5, wherein initiating fulfillment further comprises requesting that the user confirm acquisition of the item.

7. The method as recited in claim 5, further comprising:
identifying a payment instrument associated with the at least one stored free-form gesture and the user account, and
wherein the initiating the fulfillment further comprises at least causing the payment instrument to be charged for a cost of the item or requesting that the user confirm use of the payment instrument for the cost of the item.

8. The method as recited in claim 5, wherein:
the item is a physical item;
the method further comprises identifying a shipping address associated with the at least one free-form gesture and the user account; and
initiating the fulfillment further comprises shipping the physical item to the shipping address at the shipping speed.

9. The method as recited in claim 5, wherein the one or more transaction details include an item cost, and the criteria of the one or more rules specify a maximum item cost associated with the at least one stored free-form gesture; and
wherein determining that the one or more transaction details satisfy the criteria of the one or more rules is based at least in part on comparing the maximum item cost to the item cost of the item requested to be acquired by the user.

10. The method as recited in claim 5, wherein the one or more transaction details include an item category, and the criteria of the one or more rules specify one or more item categories associated with the at least one stored free-form gesture; and
wherein determining that the one or more transaction details satisfy the criteria of the one or more rules is based at least in part on comparing the one or more item categories to the item category of the of the item requested to be acquired by the user.

11. The method as recited in claim 5, further comprising determining a geographical location of the client device based at least in part on receiving the at least one free-form gesture on the touchscreen; and
wherein determining that the one or more transaction details satisfy the criteria of the one or more rules is based at least in part on at least one authorized geographical location at which the at least one free-form gesture is authorized for use.

12. The method as recited in claim 5, further comprising determining a time at which the client device receives the at least one free-form gesture on the touchscreen; and
wherein determining that the one or more transaction details satisfy the criteria of the one or more rules is based at least in part on at least one authorized period of time at which the at least one stored free-form gesture is authorized for use.

13. The method as recited in claim 5, further comprising, prior to authenticating the request, converting the at least one free-form gesture received via the touchscreen to an image.

14. The method as recited in claim 5, wherein the identifier comprises at least a user name, an email address, a telephone number, or state information stored on the client device.

15. The method as recited in claim 5, wherein the at least one stored free-form gesture of the plurality of previously stored free-form gestures is associated with a respective payment instrument or shipping address.

16. The method as recited in claim 5, wherein individual stored free-form gestures of the plurality of previously stored free-form gestures are associated with one or more respective rules indicating when the individual stored free-form gestures are authorized for use.

17. A system, comprising:
at least one computing device configured to implement one or more services, the one or more services being configured to perform acts comprising:
receiving, from a client device:
an identifier,
a request to acquire an item for purchase, the item being associated with one or more transaction details, and
a representation of a gesture made by a user on a touchscreen of the client device;
determining, based at least in part on receiving the identifier, a user account associated with the client device;
identifying, based at least in part on determining the user account, a plurality of previously stored gestures associated with the user account, individual stored gestures of the plurality of previously stored gestures being associated with one or more rules and having been previously created by a user associated with the user account;
authenticating the request based at least in part on a similarity between the representation of the gesture and a stored gesture of the plurality of previously stored gestures being greater than a threshold, the threshold being set by the user associated with the client device;
identifying the one or more rules associated with the stored gesture, the one or more rules specifying criteria that the one or more transaction details are to satisfy prior to fulfilling the request to acquire the item for purchase; and
based at least in part on the one or more transaction details satisfying the one or more rules:
identifying a shipping speed associated with the stored gesture; and
processing the request, wherein processing the request includes supplying the item with the shipping speed associated with the stored gesture.

18. The system as recited in claim 17, the acts further comprising:
receiving a request from the user to:
remove at least one stored gesture from the plurality of previously stored gestures, or
add an additional gesture to the plurality of previously stored gestures; and
wherein removing the at least one stored gesture or adding the additional gesture includes requesting authentication of the user using a password or a personal identification number (PIN) prior to removing the at least one stored gesture or adding the additional gesture.

19. The system as recited in claim 17, wherein the gesture comprises at least a free-form gesture, a gesture connecting multiple different static points in a predefined order, or a fingerprint of the user on the touchscreen.

20. One or more non-transitory computer-readable media storing computer-executable instructions that, when executed on one or more processors, cause the one or more processors to perform acts comprising:
receiving, via a touchscreen associated with a client device:
an identifier, and
a request to acquire a digital item offered by an entity, the digital item being associated with one or more transaction details;
determining, based at least in part on receiving the identifier, a user account associated with the client device;
identifying, based at least in part on determining the user account, a plurality of previously stored gestures associated with the user account, individual stored gestures of the plurality of previously stored gestures being associated with one or more rules and having been created by a user associated with the user account;
prompting, based at least in part in response to receiving the request, an input of a gesture via the touchscreen;
receiving a particular gesture via the touchscreen;
comparing the particular gesture to the plurality of previously stored gestures;
determining that a similarity between the particular gesture and at least one stored gesture of the plurality of previously stored gestures is greater than a similarity threshold, the similarity threshold being set by a user associated with the user account;
identifying the one or more rules associated with the at least one stored gesture, the one or more rules specifying criteria that the one or more rules are to satisfy prior to fulfillment of the request;
determining that the one or more transaction details satisfy the criteria of the one or more rules; and
based at least in part on determining that the one or more transaction details satisfy the criteria of the one or more rules:
identifying a device address associated with the at least one stored gesture; and
processing the request, wherein processing the request includes initiating delivery of the digital item to the device address associated with the at least one stored gesture.

21. The one or more non-transitory computer-readable media as recited in claim 20, wherein processing the request further comprises providing the request to acquire the digital item to the entity.

22. The one or more non-transitory computer-readable media as recited in claim 20, wherein the user account is associated with the client device.

23. The one or more non-transitory computer-readable media as recited in claim 20, the acts further comprising providing, based at least in part on processing the request, a confirmation that the request has been accepted.

24. The one or more non-transitory computer-readable media as recited in claim 20, wherein the gesture comprises a free-form gesture or a gesture connecting multiple different static points in a predefined order.

25. The one or more non-transitory computer-readable media as recited in claim 20, wherein receiving the gesture comprises receiving a fingerprint of the user via the touchscreen.

26. The one or more non-transitory computer-readable media as recited in claim 20, wherein the one or more rules include a preferred media format for electronic media associated with the request.

27. The one or more non-transitory computer-readable media as recited in claim 20, wherein the stored gesture is associated with a purchase of digital content in a predetermined format and a user email address; and
wherein initiating fulfillment of the digital item comprises transmitting the digital content in the predetermined format to the user email address.

28. The method as recited in claim 20, wherein the one or more rules includes a device address authorized for conducting an electronic transaction associated with the request to acquire the digital item, and wherein initiating fulfilment of the digital item comprises delivering the digital item to the device address.

\* \* \* \* \*